US010361467B2

(12) United States Patent
Kubo

(10) Patent No.: US 10,361,467 B2
(45) Date of Patent: Jul. 23, 2019

(54) POWER SUPPLY DEVICE

(71) Applicant: Panasonic Intellectual Property Management Co., Ltd., Osaka (JP)

(72) Inventor: Masahiko Kubo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 15/503,866

(22) PCT Filed: Sep. 15, 2015

(86) PCT No.: PCT/JP2015/004685
§ 371 (c)(1),
(2) Date: Feb. 14, 2017

(87) PCT Pub. No.: WO2016/047095
PCT Pub. Date: Mar. 31, 2016

(65) Prior Publication Data
US 2017/0237128 A1 Aug. 17, 2017

(30) Foreign Application Priority Data
Sep. 26, 2014 (JP) .................. 2014-197578

(51) Int. Cl.
H02J 7/00 (2006.01)
H02J 9/06 (2006.01)
(Continued)

(52) U.S. Cl.
CPC ......... *H01M 10/44* (2013.01); *H01M 2/1022* (2013.01); *H01M 10/425* (2013.01);
(Continued)

(58) Field of Classification Search
CPC ............... H01M 10/44; H01M 10/425; H01M 10/4257; H02J 7/00; H02J 7/0068; H02J 7/34; H02J 9/06
See application file for complete search history.

(56) References Cited

U.S. PATENT DOCUMENTS 5,982,145 A 11/1999 Eguchi
2005/0213272 A1 9/2005 Kobayashi
(Continued)

FOREIGN PATENT DOCUMENTS

CN 101017984 A 8/2007
EP 871275 A2 10/1998
(Continued)

OTHER PUBLICATIONS

International Search Report of PCT application No. PCT/JP2015/004685 dated Dec. 8, 2015.

*Primary Examiner* — Jonathan G Jelsma
(74) *Attorney, Agent, or Firm* — McDermott Will & Emery LLP

(57) ABSTRACT

A first battery pack includes a first battery module and a first controller. A second battery pack includes a second battery module and a second controller. The first battery pack and the second battery pack are installed to be freely attachable and detachable in relation to a main body. An activation manager performs an activation instruction such that the first controller and the second controller do not activate at a same timing. The first controller which activates earlier operates in an ordinary mode in which power is supplied from the first battery module to an AC load. The second controller which activates later operates in a standby mode in which power is not supplied from the second battery module to the AC load.

6 Claims, 5 Drawing Sheets

(51) Int. Cl.
    *H01M 10/42*     (2006.01)
    *H01M 10/44*     (2006.01)
    *H01M 2/10*      (2006.01)
    *H01M 10/48*     (2006.01)
    *H02J 9/00*      (2006.01)

(52) U.S. Cl.
    CPC ....... *H01M 10/4257* (2013.01); *H01M 10/48* (2013.01); *H02J 7/0031* (2013.01); *H02J 7/0047* (2013.01); *H02J 7/0068* (2013.01); *H02J 9/06* (2013.01); *H01M 2220/30* (2013.01); *H02J 7/0013* (2013.01); *H02J 9/00* (2013.01); *H02J 2007/005* (2013.01); *H02J 2007/0067* (2013.01)

(56) References Cited

U.S. PATENT DOCUMENTS

| | | |
|---|---|---|
| 2007/0188135 A1 | 8/2007 | Odaohhara |
| 2009/0309419 A1* | 12/2009 | Yamasaki ............... G06F 1/263 307/39 |
| 2011/0313613 A1 | 12/2011 | Kawahara et al. |
| 2014/0002003 A1* | 1/2014 | Kim .......................... H02J 7/00 320/103 |
| 2014/0091770 A1 | 4/2014 | Lee et al. |
| 2014/0346873 A1* | 11/2014 | Colangelo ................ H02J 1/00 307/29 |

FOREIGN PATENT DOCUMENTS

| | | |
|---|---|---|
| JP | 10-341535 A | 12/1998 |
| JP | 2003-143769 A | 5/2003 |
| JP | 2005-278257 A | 10/2005 |
| JP | 2005-323483 A | 11/2005 |
| JP | 2007-215251 A | 8/2007 |
| JP | 2012-253838 | 12/2012 |
| JP | 2015-507451 A | 3/2015 |
| WO | 2010/109956 A1 | 9/2010 |

* cited by examiner

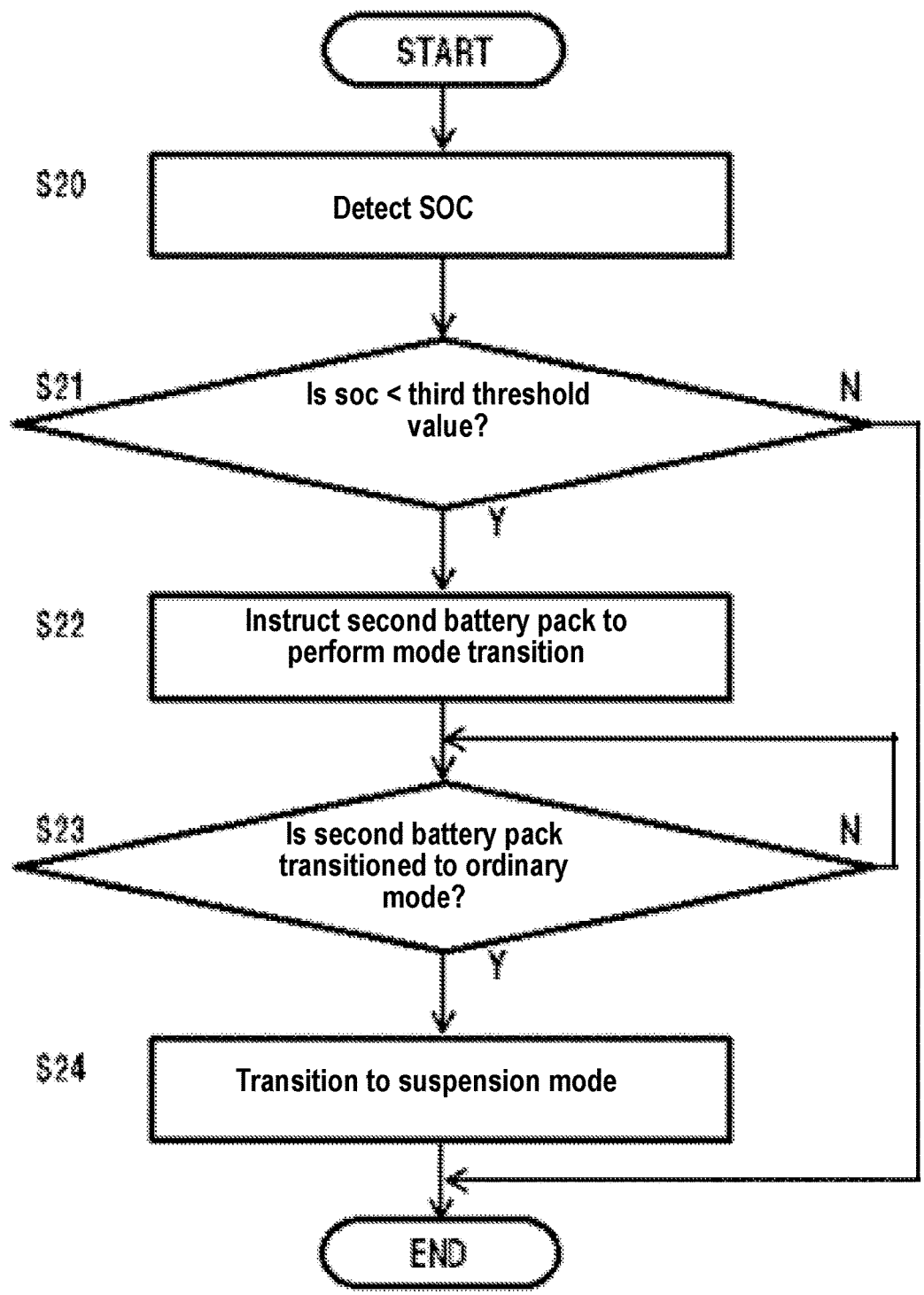

POWER SUPPLY DEVICE

CROSS-REFERENCE TO RELATED APPLICATIONS

This application is a U.S. national stage application of the PCT International Application No. PCT/JP2015/004685 filed on Sep. 15, 2015, which claims the benefit of foreign priority of Japanese patent application No. 2014-197578 filed on Sep. 26, 2014, the contents all of which are incorporated herein by reference.

TECHNICAL FIELD

The present invention relates to a power supply device.

BACKGROUND ART

A portable power supply device which is provided with secondary batteries such as lithium ion batteries, and which performs a supply of power from the secondary batteries in a case in which there is a power outage in a commercial alternating current power source, and in a case in which a commercial alternating current power source may not be used due to being outdoors is known. In the portable power supply device, there is demand for lengthening in time of the duration of the supply of power, and improving the portability for carrying the power supply device outdoors, and the durability and the reliability for realizing a stable supply of power even under an outdoor environment. In a method of the related art, an integrally configured battery module is disposed to stand on a base, and an inverter and a control board are disposed adjacent to the battery module (refer to Patent Literature 1 below).

CITATION LIST

Patent Literature

PTL 1: JP-A-2012-253838

SUMMARY OF THE INVENTION

Although it may be possible to increase the spatial density of the inner portion of the device using the method of the related art described above, since a battery module, an inverter, and a control board which controls the battery module and the inverter are integrally housed in the power supply device, in a case in which an abnormality arises in the control board due to some factor, the power supply device may become unusable.

Therefore, an object of the present invention is to provide a power supply device with which it is possible to lengthen a time of duration of the supply of power, and to perform the stable supply of power even under an outdoor environment.

A power supply device according to the present invention including a power converter and capable of supplying power to a load, includes a first battery pack which includes a first battery module including a plurality of batteries, and a first controller which is supplied with power from the first battery module and controls an entirety of the power supply device, and which is installed to be freely attachable and detachable in relation to a main body of the power supply device, a second battery pack which includes a second battery module including a plurality of batteries, and a second controller which is supplied with power from the second battery module and controls the entirety of the power supply device, and which is installed to be freely attachable and detachable in relation to the main body of the power supply device, and an activation manager which instructs activation of the first controller and the second controller such that the first controller and the second controller do not activate at a same timing, in which in a case in which the first controller activates earlier than the second controller, the first controller controls the entirety of the power supply device and operates in an ordinary mode in which power is supplied from the first battery module to the load, and the second controller operates in a standby mode in which power is not supplied from the second module to the load while the first controller is operating in the ordinary mode.

According to the present invention, it is possible to provide a power supply device with which it is possible to lengthen a time of duration of the supply of power, and to perform the stable supply of power even under an outdoor environment.

BRIEF DESCRIPTION OF DRAWINGS

FIG. 6 is an operational flowchart relating to the transition control of the operational modes.

DESCRIPTION OF EMBODIMENT

Figure 1:
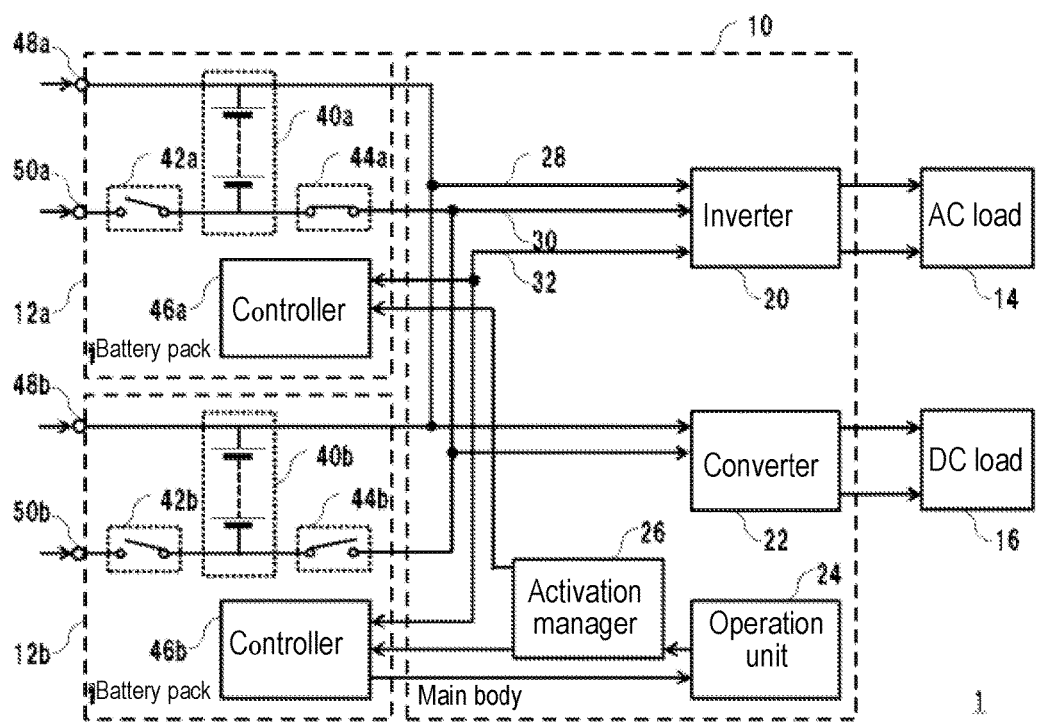
FIG. 1 is a diagram for explaining power supply device according to the exemplary embodiment of the present invention.

An overview will be given before giving a specific explanation of the exemplary embodiment of the present invention. In order to lengthen the time of the duration of a portable power supply device, it is conceivable to provide at least two battery packs, and, when a charge state of one battery pack which is performing the supply of power is reduced, to switch to the supply of power from the other battery pack. If it is possible to remove the one battery pack which becomes unable to perform the supply of power, it is possible to reduce the weight of the power supply device, and it is possible to improve portability. If a controller which controls the entirety of the power supply device is included in each battery pack, even in a case in which an abnormality arise in the controller of one of the battery packs and the supply of power may not longer be performed from the power supply device, by removing the one battery pack and switching such that the controller of the other battery pack controls the entirety of the power supply device, it is possible to continue the supply of power, and it is possible to improve the durability and the reliability of the entirety of the power supply device. In this case, since each controller receives a supply of power from each battery pack to operate, due to the controller of the other battery pack performing intermittent operation so as to suppress power consumption while the one battery pack performs the supply of power, it is possible to suppress the power consumption during standby in which the supply of power is not performed to lengthen the duration. In a case in which a main body is connected to each of the one battery pack and the other battery pack via a power line, and the supply of power is performed from the one battery pack, if the voltage level of the power line is monitored, it is possible to easily determine whether the supply of power is being performed from the one battery pack. When the one battery pack and the other battery pack activate at the same time, since it may not be possible to determine whether or not the supply of power is being performed even if the voltage level of the power line is monitored, it is preferable to prohibit the one battery pack and the other battery pack from activating at the same timing.

Therefore, in the exemplary embodiment of the present invention, a controller which controls the entirety of the power supply device is included in each of the one battery pack and the other battery pack, each of the one battery pack and the other battery pack is mounted to be freely attachable and detachable in relation to the main body of the power supply device, and the one battery pack and the other battery pack are prohibited from activating at the same time. Accordingly, it is possible to simply set the operational mode of the one battery pack to an ordinary mode in which the supply of power is performed, and the operational mode of the other battery pack to a standby mode in which the supply of power is not performed. As a result, it is possible to realize a lengthening in the time of the duration of the supply of power and the stable supply of power using a simple configuration.

Hereinafter, specific description will be given of an example of the exemplary embodiment of the present invention with reference to the drawings. In each diagram which is referred to, the same portions will be given the same symbols, and redundant description relating to the same portions will generally be omitted.

FIG. 1 is a diagram for explaining power supply device 1 according to the exemplary embodiment of the present invention. In the exemplary embodiment, a portable power supply device for backup use which supplies AC power to AC load 14 and is capable of supplying a direct current load to DC load 16 is assumed as power supply device 1. Power supply device 1 is provided with main body 10, and first battery pack 12a and second battery pack 12b which are collectively referred to as battery pack 12. First battery pack 12a and second battery pack 12b are installed to be freely attachable and detachable in relation to main body 10. Main body 10 is provided with inverter 20 (also referred to as power converter), converter 22, operation unit 24, activation manager 26, first power line 28, second power line 30, and communication line 32. First battery pack 12a is provided with first battery module 40a, first charging switch 42a, first discharging switch 44a (also referred to as first switch), first controller 46a, first positive electrode terminal 48a, and first negative electrode terminal 50a. Second battery pack 12b is provided with second battery module 40b, second charging switch 42b, second discharging switch 44b (also referred to as second switch), second controller 46b, second positive electrode terminal 48b, and second negative electrode terminal 50b.

Hereinafter, as necessary, first battery module 40a and second battery module 40b may be collectively referred to as battery module 40. Similarly, first charging switch 42a and second charging switch 42b may be collectively referred to as charging switch 42, first discharging switch 44a and second discharging switch 44b may be collectively referred to as discharging switch 44, and first controller 46a and second controller 46b may be collectively referred to as controller 46. Similarly, first positive electrode terminal 48a and second positive electrode terminal 48b may be collectively referred to as positive electrode terminal 48, first negative electrode terminal 50a and second negative electrode terminal 50b may be collectively referred to as negative electrode terminal 50, and first power line 28 and second power line 30 may be collectively referred to as the power line.

Inverter 20 discharges battery module 40 according to instructions from controller 46, converts DC power which is supplied from battery module 40 via the power line into AC power, and supplies the AC power to AC load 14. When discharging, inverter 20 manages the discharge voltage and the discharge current according to instructions from controller 46.

Converter 22 converts the voltage level of the DC power which is supplied via the power line from battery module 40 to a predetermined voltage level and supplies the result to DC load 16.

Figure 2:
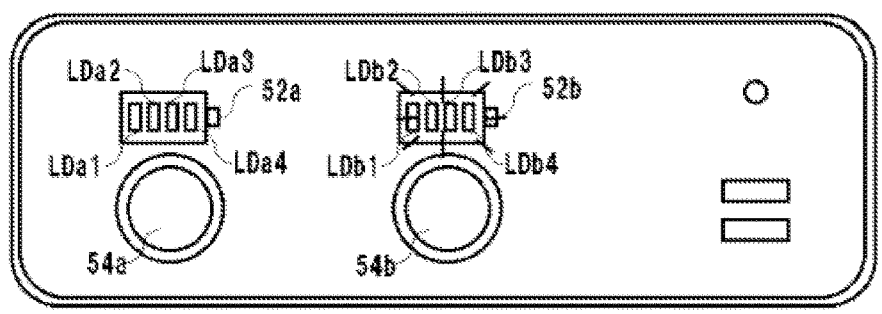
FIG. 2 is a diagram for explaining operation unit according to the exemplary embodiment of the present invention.

FIG. 2 is a diagram for explaining operation unit 24 according to the exemplary embodiment of the present invention. Operation unit 24 includes first state display 52a and second state display 52b which are collectively referred to as state display 52, and first activate/suspend button 54a and second activate/suspend button 54b which are collectively referred to as activate/suspend button 54. First state display 52a and first activate/suspend button 54a are associated with first battery pack 12a, and second state display 52b and second activate/suspend button 54b are associated with second battery pack 12b. The user long-pushes first activate/suspend button 54a to instruct the activation of first battery pack 12a, and long-pushes second activate/suspend button 54b to instruct the activation of second battery pack 12b. Operation unit 24 outputs the activation instruction which is input from the user to activation manager 26. First state display 52a includes light emitting diode LDa1, light emitting diode LDa2, light emitting diode LDa3, and light emitting diode LDa4. Similarly, second state display 52b includes light emitting diode LDb1, light emitting diode LDb2, light emitting diode LDb3, and light emitting diode LDb 4. Operation unit 24 notifies the user of an SOC (State Of Charge), which is an indicator which indicates the charge state (also referred to as the charge rate) received from controller 46, abnormality state information such as over charging or discharging by lighting the four light emitting diodes of state display 52. For example, operation unit 24 causes light emitting diode LDa1 or light emitting diode LDb1 to blink based on the abnormality state information which is received from controller 46. Operation unit 24 lights, in a graded manner, light emitting diode LDa2, light emitting diode LDa3, and light emitting diode LDa 4, or, light emitting diode LDb2, light emitting diode LDb3, and light emitting diode LDb4 based on the SOC which is received from controller 46. Operation unit 24 notifies the user of the fact that the corresponding battery pack is in standby mode by causing all four of the light emitting diodes to blink.

Activation manager 26 prohibits first battery pack 12a and second battery pack 12b from activating at the same timing. In a case in which the user long-pushes first activate/suspend button 54a and second activate/suspend button 54b at the same time and instructs the activation of each of first battery pack 12a and second battery pack 12b, activation manager 26 prohibits both first battery pack 12a and second battery pack 12b from activating. On the other hand, in a case in which the user long-pushes either first activate/suspend button 54a or second activate/suspend button 54b and instructs the activation of either first battery pack 12a or second battery pack 12b, activation manager 26 allows the activation of battery pack 12 which is indicated.

Figure 3:
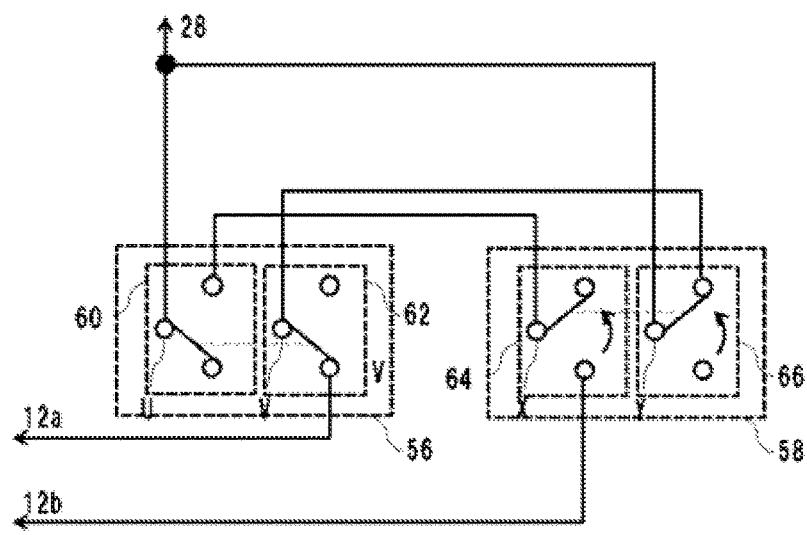
FIG. 3 is a diagram for explaining activation manager according to the exemplary embodiment of the present invention.

FIG. 3 is a diagram for explaining activation manager 26 according to the exemplary embodiment of the present invention. Activation manager 26 includes first selector 56 and second selector 58. First selector 56 includes first switcher 60 and second switcher 62, and second selector 58 includes third switcher 64 and fourth switcher 66. First switcher 60, second switcher 62, third switcher 64, and fourth switcher 66 are mechanical switches, for example. First switcher 60 includes contact U. Similarly, second switcher 62 includes contact V, third switcher 64 includes contact X, and fourth switcher 66 includes contact Y.

Contact U is a contact for switching the output from first power line 28 to the input side of third switcher 64. Contact V is a contact for switching the output from fourth switcher 66 to the input side of first battery pack 12a. Contact X is a contact for switching the output from first switcher 60 to the input side of second battery pack 12b. Contact Y is a contact for switching the output from first power line 28 to the input side of second switcher 62.

Activation manager 26 determines the connection state of first switcher 60 and second switcher 62 in accordance with second activate/suspend button 54b being long-pushed. Specifically, when second activate/suspend button 54b is long-pushed, the first contact (the contact of the top side of FIG. 3) of each of first switcher 60 and second switcher 62 is closed, and if not, the second contact (the contact of the bottom side of FIG. 3) of each of first switcher 60 and second switcher 62 is closed. Similarly, activation manager 26 determines the connection state of third switcher 64 and fourth switcher 66 in accordance with first activate/suspend button 54a being long-pushed. Specifically, when first activate/suspend button 54a is long-pushed, the first contact of each of third switcher 64 and fourth switcher 66 is closed, and if not, the second contact of each of third switcher 64 and fourth switcher 66 is closed.

When second activate/suspend button 54b is not being long-pushed (that is, the second contact of each of first switcher 60 and second switcher 62 is closed), when first activate/suspend button 54a is long-pushed (that is, the first contact of each of third switcher 64 and fourth switcher 66 is closed), activation manager 26 outputs the voltage level of the first power line to first battery pack 12a. When first activate/suspend button 54a is not being long-pushed (that is, the second contact of each of third switcher 64 and fourth switcher 66 is closed), when second activate/suspend button 54b is long-pushed (that is, the first contact of each of first switcher 60 and second switcher 62 is closed), activation manager 26 outputs the voltage level of the first power line to second battery pack 12b.

On the other hand, if first activate/suspend button 54a and second activate/suspend button 54b are not long-pushed (that is, the second contact of each of first switcher 60, second switcher 62, third switcher 64, and fourth switcher 66 is closed), activation manager 26 does not output the voltage level of the first power line to first battery pack 12a and second battery pack 12b. When first activate/suspend button 54a and second activate/suspend button 54b are long-pushed (that is, the first contact of each of first switcher 60, second switcher 62, third switcher 64, and fourth switcher 66 is closed), activation manager 26 does not output the voltage level of the first power line to first battery pack 12a and second battery pack 12b.

When controller 46 receives the voltage level of the first power line from activation manager 26, controller 46 executes an activation process. In this manner, activation manager 26 performs instruction of activation in relation to first controller 46a and second controller 46b such that first battery pack 12a and second battery pack 12b do not activate at the same timing.

Return to FIG. 1. First power line 28 is wiring for connecting the plus side of battery module 40 to the plus side of each of inverter 20 and converter 22. Second power line 30 is wiring for connecting the minus side of battery module 40 to the minus side of each of inverter 20 and converter 22. Communication line 32 transmits and receives command signals and the like between controller 46 and inverter 20 using a transmission system which conforms to the EIA-485 standard, for example.

Figure 4:
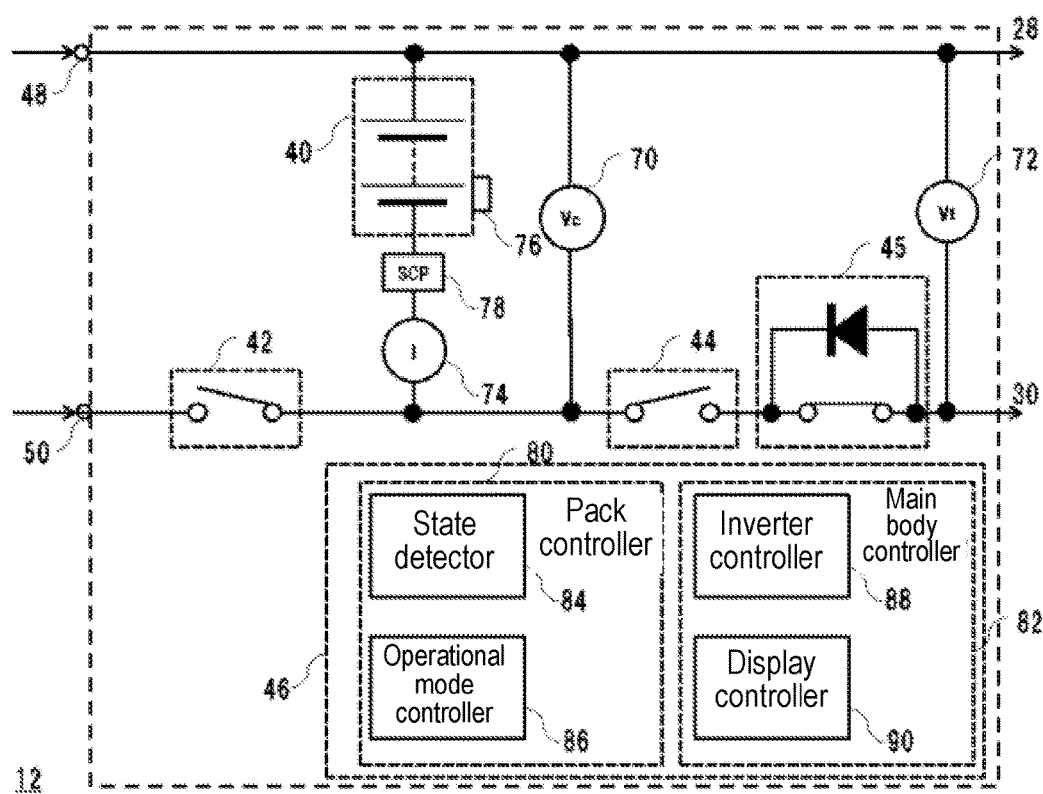
FIG. 4 is a diagram for explaining battery pack according to the exemplary embodiment of the present invention.

FIG. 4 is a diagram for explaining battery pack 12 according to the exemplary embodiment of the present invention. Battery pack 12 includes, in addition to battery module 40, charging switch 42, discharging switch 44, positive electrode terminal 48, and negative electrode terminal 50 which are described above, reverse current prevention circuit 45, terminal voltage meter 70, power line voltage meter 72, current meter 74, temperature meter 76, and SCP 78. In the same manner as battery module 40 and the like described above, in a case in which these are included in first battery pack 12a, they are denoted as first reverse current prevention circuit 45a, first terminal voltage meter 70a, first power line voltage meter 72a, first current meter 74a, first temperature meter 76a, and first SCP 78a. In a case in which these are included in second battery pack 12b, they are denoted as second reverse current prevention circuit 45b, second terminal voltage meter 70b, second power line voltage meter 72b, second current meter 74b, second temperature meter 76b, and second SCP 78b.

Battery module 40 is formed from one or more secondary batteries. The secondary batteries which are included in battery module 40 are lithium ion batteries or nickel hydride batteries, for example. In FIG. 4, battery module 40 is formed by a plurality of secondary batteries which are connected in series; however, the number of secondary batteries which form battery module 40 may be one. A portion or all of the secondary batteries which are included in battery module 40 may be connected to each other in parallel. In the exemplary embodiment, discharging and charging mean the discharging and the charging of battery module 40 as long as there is no particular explanation.

Charging switch 42 is a switching element which is disposed between negative electrode terminal 50 and current meter 74. Discharging switch 44 is a switching element which is disposed between reverse current prevention circuit 45 and current meter 74. It is possible to use an n-type MOSFET (Metal-Oxide-Semiconductor Field-Effect Transistor), which is a semiconductor switch, for example, as the switching element. An IGBT (Insulated Gate Bipolar Transistor), a GaN transistor, a SiC transistor, or the like may be used instead of the n-type MOSFET. Reverse current prevention circuit 45 is a parallel circuit of a switching element and a diode which is disposed between discharging switch 44 and second power line 30. The cathode terminal of the diode of reverse current prevention circuit 45 is connected to discharging switch 44, and the anode terminal is connected to second power line 30. The diode of reverse current prevention circuit 45 may be a parasitic diode of the switching element. In order to realize seamless switching of battery packs 12, it is preferable for the switching source battery pack 12 and the switching destination battery pack 12 to both be connected to second power line 30. However, since the switching source battery pack 12 has a higher voltage than the switching destination battery pack 12, when the switching source battery pack 12 and the switching destination battery pack 12 are both connected to second power line 30, there is a concern that current will flow in reverse from the switching destination battery pack 12 to the switching source battery pack 12. Therefore, when switching battery packs 12, the switching element of reverse current prevention circuit 45 is set to an open state such that the switching source battery pack 12 is connected to discharging switch 44 and second power line 30 via the diode of reverse current prevention circuit 45. Accordingly, since the switching source battery pack 12 is connected to second power line 30 via the diode of reverse current prevention circuit 45, it is possible to prevent current from flowing in reverse from the switching destination battery pack 12.

Positive electrode terminal 48 is a terminal for connecting the plus side of battery module 40 to the plus side of a charger which is not depicted. Negative electrode terminal 50 is a terminal for connecting the minus side of battery module 40 to the minus side of a charger which is not depicted.

Terminal voltage meter 70 is disposed between battery module 40 and discharging switch 44, and detects voltage value Vd of a terminal voltage of each of the plurality of secondary batteries (potential difference between the positive electrode and the negative electrode of each of the plurality of secondary batteries) which form battery module 40. Terminal voltage meter 70 outputs voltage value Vd of each of the secondary batteries which is detected is output to controller 46.

Power line voltage meter 72 is disposed between discharging switch 44 and the power line, and detects voltage value Vpl of the potential difference between first power line 28 and second power line 30. Power line voltage meter 72 outputs voltage value Vpl which is detected to controller 46. Current meter 74 (for example, a shunt resistance) is disposed between SCP 78 and charging switch 42 and discharging switch 44, and measures current value Id of the current which flows in battery module 40. Current meter 74 outputs current value Id which is detected to controller 46. Temperature meter 76 (for example, a thermistor) detects temperature Td of battery module 40 (for example, the surface temperature of battery module 40). Temperature meter 76 outputs temperature Td which is detected to controller 46. SCP 78 secondarily protects the secondary batteries by blowing an embedded fuse such that battery module 40 does not enter an over-voltage state.

Controller 46 manages the entirety of power supply device 1. Controller 46 includes an ordinary mode, a standby mode, and a suspension mode as operational modes. The ordinary mode is an operational mode in which discharging switch 44 is set to a closed state, and a supply of power is performed from battery module 40, via inverter 20 or converter 22, to AC load 14 or DC load 16. In the ordinary mode, controller 46 receives the supply of power from battery module 40 and operates. The standby mode is an operational mode in which discharging switch 44 is set to an open state, and a supply of power is not performed to AC load 14 or DC load 16. Even in the standby mode, controller 46 receives the supply of power from battery module 40 and operates; however, controller 46 operates while alternately repeating a sleep state in which processing is suspended and an active state in which processing is executed such that the power consumption in controller 46 is lower than in the ordinary mode. The suspension mode is an operational mode in which controller 46 is suspended without receiving the supply of power from battery module 40. Controller 46 sets discharging switch 44 to the open state when transitioning to the suspension mode. In the exemplary embodiment, it is assumed that battery pack 12 is removed to be charged. Therefore, charging switch 42 is in the open state regardless of the operational mode; however, when it is detected that a charger is connected to battery pack 12 via positive electrode terminal 48 and negative electrode terminal 50, controller 46 sets charging switch 42 to the closed state and executes charging control. Controller 46 includes pack controller 80 which controls battery pack 12 side, and main body controller 82 which controls main body 10 side. Pack controller 80 includes state detector 84 and operational mode controller 86. First battery pack 12a includes first pack controller 80a and first main body controller 82a, and first pack controller 80a includes first state detector 84a and first operational mode controller 86a. In the same manner, second battery pack 12b includes second pack controller 80b and second main body controller 82b, and second pack controller 80b includes second state detector 84b and second operational mode controller 86b.

State detector 84 uses the battery-state data which includes current value Id, voltage value Vd, and temperature Td to estimate the battery state such as the SOC of battery module 40, an SOH (State Of Health) which is an index indicating the degree of deterioration, internal resistance R, permissible charging and discharging power, and the like. When state detector 84 detects an abnormality state such as over-charging, over-discharging, low temperature, or high temperature, state detector 84 outputs the abnormality state as abnormality state information.

For example, state detector 84 integrates current values Id which are received from current meter 74 and estimates the SOC of each of the secondary batteries. State detector 84 may estimate open voltage OCV (Open Circuit Voltage) of each of the secondary batteries from voltage value Vd which is received from terminal voltage meter 70, and refers to an SOC-OCV table which denotes the relationship between the SOC and the OCV to estimate the SOC.

For example, using equation (1) and equation (2) denoted below, state detector 84 estimates the SOH of each of the secondary batteries based on a variation value of the estimated SOC, and the current integration value in a period which is necessary for the variation.

$$SOH = (FCC/Ci) \times 100 \quad (1)$$

$$FCC = (Qt/\Delta SOC) \times 100 \quad (2)$$

Here, FCC (Full Charge Capacity) indicates the full charge capacity of the secondary batteries, Ci indicates the initial capacity (the design capacity) of the secondary batteries, $\Delta SOC$ indicates the change value of the SOC, and Qt indicates the zone capacity (the current integration value) which is necessary for $\Delta SOC$. In other words, SOH is defined by the proportion of full charge capacity FCC in relation to initial capacity Ci. As is clear from the definition of SOH, when the degree of degradation becomes greater, the SOH becomes smaller.

For example, state detector 84 refers to the SOC-R table which denotes the relationship between the SOC and internal resistance R while allowing for the estimated SOH and temperature Td which is received from temperature meter 76, and estimates internal resistance R.

Operational mode controller 86 determines the operational mode of controller 46. When operational mode controller 86 receives an activation instruction from activation manager 26 in the suspension mode, operational mode controller 86 refers to voltage value Vpl which is received from power line voltage meter 72, and determines whether to operate in the ordinary mode or to operate in the standby mode. Therefore, operational mode controller 86 compares voltage value Vpl to a first threshold value. At the timing at which the activation instruction is received from activation manager 26, its own discharging switch 44 is in the open state. Accordingly, if voltage value Vpl is greater than the first threshold value, the other battery pack 12 is already in the ordinary mode and is performing the supply of power to inverter 20. In this case, operational mode controller 86 determines that operation will be performed in the standby mode. On the other hand, if voltage value Vpl is less than or equal to the first threshold value, no battery packs 12 in the ordinary mode are present. In this case, operational mode controller 86 determines that operation will be performed in the ordinary mode.

When a plurality of battery packs 12 refer to voltage value Vpl at the same timing, it is determined that no battery packs 12 in the ordinary mode are present, and there is a possibility that a plurality of battery packs 12 operate in the ordinary mode at the same time. In the exemplary embodiment, since the activation of a plurality of battery packs 12 is prohibited by activation manager 26, operational mode controller 86 is capable of determining the operational mode without making an erroneous determination.

When determining the operational mode, operational mode controller 86 is also capable of referring to whether communication is being performed with the inverter via communication line 32. In a case in which the other battery pack 12 is already in the ordinary mode and is performing the supply of power to inverter 20, since the discharging control, command signals and the like are transmitted and received via communication line 32. Therefore, in a case in which voltage value Vpl is smaller than the first threshold value and communication is not being executed with the inverter via communication line 32, operational mode controller 86 may determine that operation is to be performed in the ordinary mode. Accordingly, it is possible to more accurately determine the operational mode, and it is possible to further improve the reliability.

When the SOC of battery module 40 becomes low in the ordinary mode, operational mode controller 86 performs instruction via communication line 32 to the other battery pack 12 which is in the standby mode to transition to the ordinary mode. Hereinafter, for convenience of explanation, it is assumed that the operational mode of first battery pack 12a is the ordinary mode, and the operational mode of second battery pack 12b is the standby mode. When the SOC of first battery module 40a becomes lower than the third threshold value (also referred to as a predetermined threshold value), first operational mode controller 86a sets the switching element of first reverse current prevention circuit 45a to the open state, and performs instruction to second battery pack 12b via communication line 32 to transition to the ordinary mode. If the SOC of second battery module 40b becomes greater than the fourth threshold value (third threshold value<fourth threshold value), second operational mode controller 86b which receives the instruction via communication line 32 sets the switching element of second reverse current prevention circuit 45b to the closed state, sets second discharging switch 44b to the closed state, and transitions to the ordinary mode. Second operational mode controller 86b notifies first battery pack 12a via communication line 32 of the fact that second operational mode controller 86b is transitioned to the ordinary mode. First operational mode controller 86a which receives the notification via communication line 32 sets first discharging switch 44a to the open state, and subsequently transitions to the suspension mode. Since the supply of power from first battery pack 12a is continued until second battery pack 12b transitions to the ordinary mode, it is possible to realize a seamless switching of battery packs 12.

Main body controller 82 includes inverter controller 88 and display controller 90. First main body controller 82a includes first inverter controller 88a and first display controller 90a. Similarly, second main body controller 82b includes second inverter controller 88b and second display controller 90b.

Inverter controller 88 transmits and receives command signals and the like between inverter controller 88 and inverter 20 via communication line 32, and executes the discharging control. Display controller 90 outputs the SOC and the abnormality state information which are received from state detector 84 to operation unit 24.

Figure 5:
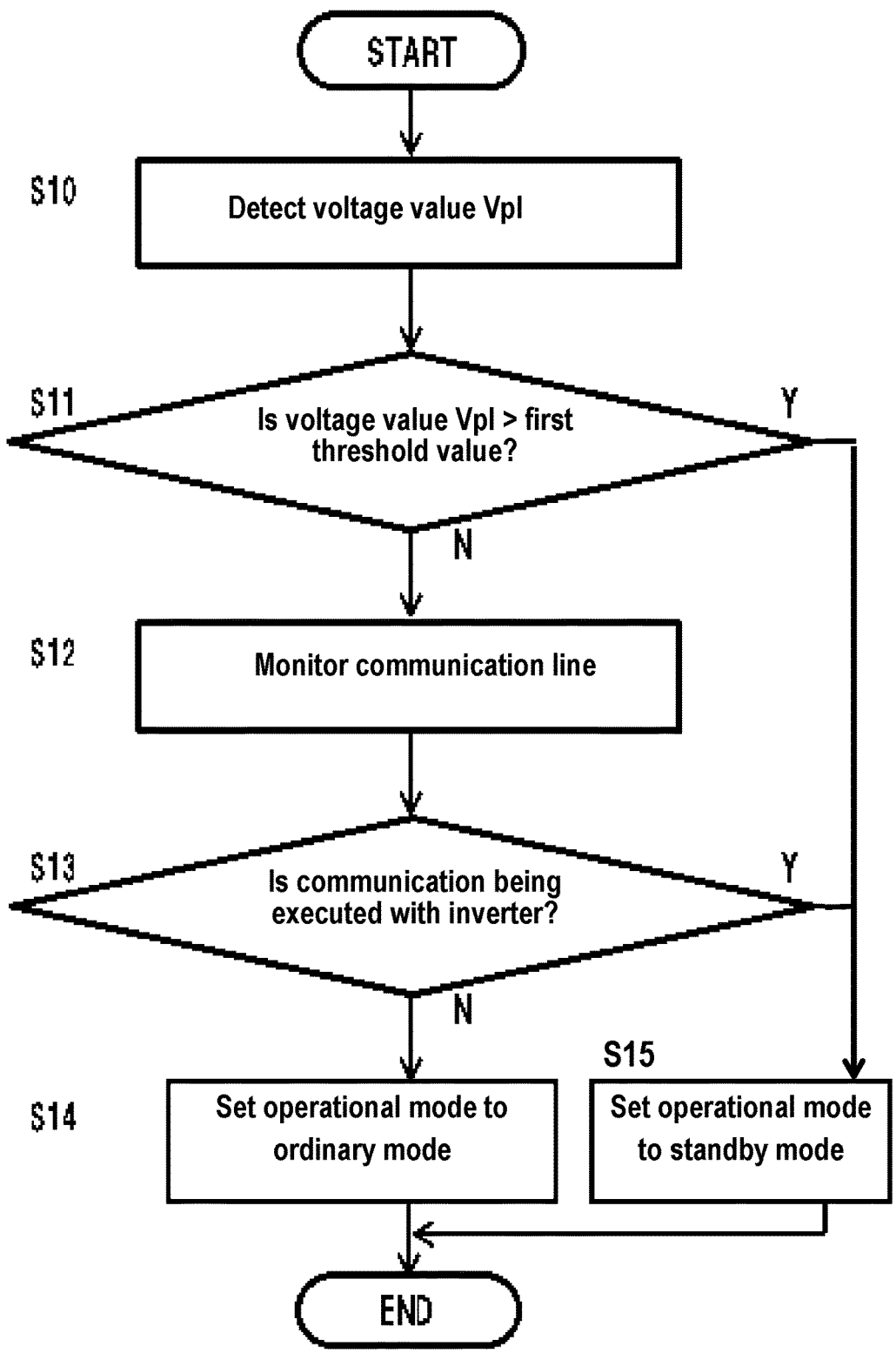
FIG. 5 is an operational flowchart relating to the setting control of the operational modes.

Description will be given of the operation of controller 46 according to the configuration which is described above. FIG. 5 is an operational flowchart relating to the setting control of the operational modes. Power line voltage meter 72 detects voltage value Vpl (S10). Operational mode controller 86 compares voltage value Vpl with first threshold value (S11). If voltage value Vpl is smaller than first threshold value (N in S11), operational mode controller 86 monitors communication line 32 (S12). Operational mode controller 86 analyzes the signal being propagated on communication line 32 and confirms whether or not it is possible to extract a command signal or the like to be transmitted or received between operational mode controller 86 and inverter 20 (S13). If communication is not being executed with inverter 20 (N in S13), operational mode controller 86 sets the operational mode to the ordinary mode (S14). In a case in which voltage value Vpl is greater than or equal to the first threshold value (Y in S11) or in a case in which communication is being executed with inverter 20 (Y in S13), operational mode controller 86 sets the operational mode to the standby mode (S15).

FIG. 6 is an operational flowchart relating to the transition control of the operational modes. First state detector 84a detects the SOC of first battery module 40a (S20). First operational mode controller 86a compares the SOC with third threshold value (S21). If the SOC is smaller than the third threshold value (Y in S21), first operational mode controller 86a instructs second battery pack 12b to transition to the ordinary mode (S22). When second battery pack 12b transitions to the ordinary mode (Y in S23), first operational mode controller 86a transitions to the suspension mode.

According to the exemplary embodiment of the present invention, first battery pack 12a includes first battery module 40a and first controller 46a. Second battery pack 12b includes second battery module 40b and second controller 46b. First battery pack 12a and second battery pack 12b are installed to be freely attachable and detachable in relation to main body 10. Activation manager 26 performs the activation instruction such that first controller 46a and second controller 46b do not activate at the same timing. First controller 46a which activates earlier operates in the ordinary mode in which power is supplied from first battery module 40a to AC load 14. Second controller 46b which activates later operates in the standby mode in which power is not supplied from second battery module 40b to AC load 14. Therefore, it is possible to accurately determine the operational mode of two battery packs 12, and it is possible to improve the durability and the reliability of the entirety of the power supply device. Second controller 46b alternately repeats the active state in which the processing is executed and the sleep state in which the processing is suspended.

Therefore, since it is possible to suppress the power consumption of second controller 46b and it is possible to decrease a reduction in the SOC of second battery module 40b during the standby mode, it is possible to lengthen the time of the duration of the supply of power. First battery module 40a is connected to inverter 20 by the power line via first discharging switch 44a, and second battery module 40b is connected to inverter 20 by the power line via second discharging switch 44b. Operational mode controller 86 determines the operational mode based on voltage value Vpl of the power line when discharging switch 44 is in the open state. Therefore, it is possible to realize a stable supply of power using a simple configuration. First battery pack 12a is installed in main body 10 in the suspension mode, and when first operational mode controller 86a determines that operation is to be performed in the ordinary mode, first discharging switch 44a is set to the closed state. Therefore, it is possible to accurately determine the operational mode. Second battery pack 12b is installed in main body 10 in the suspension mode, and when second operational mode controller 86b determines that operation is to be performed in the standby mode, first discharging switch 44a maintained in the open state. Therefore, it is possible to accurately determine the operational mode. When the SOC of first battery module 40a becomes lower than the third threshold value, first operational mode controller 86a performs instruction on second battery pack 12b to transition to the ordinary mode, and when second battery pack 12b transitions to the ordinary mode, first operational mode controller 86a sets first discharging switch 44a to the open state and transitions to the suspension mode. Therefore, it is possible to switch from first battery pack 12a to second battery pack 12b without interrupting the supply of power, and it is possible to realize a lengthening in time and a stabilization in the supply of power.

Above, description is given based on the exemplary embodiment. The exemplary embodiment is exemplary, and it is understood by the person of ordinary skill in the art that various modified examples to combinations of the configuration elements and the processing processes are possible, and that such modified examples fall within the scope of the present invention.

In the exemplary embodiment which is described above, description is given of an example of power supply device 1 which is provided with two battery packs. On this point, power supply device 1 may be provided with three or more battery packs, a single battery pack may operate in the ordinary mode, and the remaining battery packs may operate in the standby mode.

The invention according to the exemplary embodiment may be specified by the items which are described hereinafter.

[Item 1]

A power supply device including a power converter and capable of supplying power to a load, including a first battery pack which includes a first battery module including a plurality of batteries, and a first controller which is supplied with power from the first battery module and controls an entirety of the power supply device, and which is installed to be freely attachable and detachable in relation to a main body of the power supply device, a second battery pack which includes a second battery module including a plurality of batteries, and a second controller which is supplied with power from the second battery module and controls the entirety of the power supply device, and which is installed to be freely attachable and detachable in relation to the main body of the power supply device, and an activation manager which instructs activation of the first controller and the second controller such that the first controller and the second controller do not activate at a same timing, in which in a case in which the first controller activates earlier than the second controller, the first controller controls the entirety of the power supply device and operates in an ordinary mode in which power is supplied from the first battery module to the load, and the second controller operates in a standby mode in which power is not supplied from the second module to the load while the first controller is operating in the ordinary mode.

[Item 2]

The power supply device of item 1, in which the second controller alternately repeats an active state in which processing is executed and a sleep state in which processing is suspended.

[Item 3]

The power supply device of item 2, in which the first battery pack includes a first switch and the first battery module is connected by a power line via the power converter and the first switch, and the second battery pack includes a second switch and the second battery module is connected by the power line via the power converter and the second switch, and in which the first controller or the second controller determines that operation is to be performed in either the ordinary mode or the standby mode based on a voltage level of the power line when the first switch or the second switch is in an open state.

[Item 4]

The power supply device of item 3, in which the first battery pack is attached in the main body of the power supply device with the first switch in an open state, and the first controller switches the first switch to a closed state when it is determined that operation is to be performed in the ordinary mode.

[Item 5]

The power supply device of item 4, in which the second battery pack is installed in the main body of the power supply device with the second switch in an open state, and the second controller maintains the second switch in an open state when it is determined that operation is to be performed in the standby mode.

[Item 6]

The power supply device of item 5, in which the first controller includes a first state detector which detects a charge state of the first battery module, and when the charge state of the first battery module becomes lower than a predetermined threshold value, the first controller instructs the second controller to transition to the ordinary mode, and when the second controller transitions to the ordinary mode and the second switch switches to a closed state, the first controller transitions to a suspension mode in which operation is suspended, and switches the first switch to an open state.

The power supply device according to the present invention is applicable to portable backup power sources and the like.

The invention claimed is:

1. A power supply device including a power converter and capable of supplying power to a load, comprising:
a first battery pack which includes a first battery module including a plurality of batteries, and a first controller which is supplied with power from the first battery module and controls an entirety of the power supply device, and which is installed to be freely attachable and detachable in relation to a main body of the power supply device;

a second battery pack which includes a second battery module including a plurality of batteries, and a second controller which is supplied with power from the second battery module and controls the entirety of the power supply device, and which is installed to be freely attachable and detachable in relation to the main body of the power supply device; and an activation manager which instructs activation of the first controller and the second controller such that the first controller and the second controller do not activate at a same timing, wherein the first battery pack includes a first switch and the first battery module is connected by a power line via the power converter and the first switch, and the second battery pack includes a second switch and the second battery module is connected by the power line via the power converter and the second switch, wherein in a case in which the first controller activates earlier than the second controller, the first controller controls the entirety of the power supply device, connects the first battery module to the power line by controlling an open or closed state of the first switch and operates in an ordinary mode in which power is supplied from the first battery module to the load, and the second controller operates in a standby mode in which power is not supplied from the second module to the load, and disconnects the second battery module from the power line by controlling an open or closed state of the second switch while the first controller is operating in the ordinary mode, and wherein in a case in which the second controller activates earlier than the first controller, the second controller controls the entirety of the power supply device, connects the second battery module to the power line by controlling the open or closed state of the second switch and operates in an ordinary mode in which power is supplied from the second battery module to the load, and the first controller operates in a standby mode in which power is not supplied from the first module to the load, and disconnects the first battery module from the power line by controlling the open or closed state of the second switch while the second controller is operating in the ordinary mode.

2. The power supply device of claim 1,
wherein each of the first controller and the second controller alternately repeats an active state in which processing is executed and a sleep state in which processing is suspended, in the standby mode.

3. The power supply device of claim 2,
wherein the first controller or the second controller determines that operation is to be performed in either the ordinary mode or the standby mode based on a voltage level of the power line when the first switch or the second switch is in an open state.

4. The power supply device of claim 3,
wherein the first battery pack is attached to the main body of the power supply device with the first switch in an open state, and the first controller switches the first switch to a closed state when it is determined that operation is to be performed in the ordinary mode.

5. The power supply device of claim 4,
wherein the second battery pack is attached to the main body of the power supply device with the second switch in an open state, and the second controller maintains the second switch in an open state when it is determined that operation is to be performed in the standby mode.

6. The power supply device of claim 5,
wherein the first controller includes a first state detector which detects a charge state of the first battery module, and when the charge state of the first battery module becomes lower than a predetermined threshold value, the first controller instructs the second controller to transition to the ordinary mode, and when the second controller transitions to the ordinary mode and the second switch switches to a closed state, the first controller transitions to a suspension mode in which operation is suspended, and switches the first switch to an open state.

* * * * *